United States Patent
Kasai et al.

(10) Patent No.: US 7,431,879 B2
(45) Date of Patent: Oct. 7, 2008

(54) PROCESS OF PRODUCING THREE-DIMENSIONALLY SHAPED OBJECT

(75) Inventors: Seishi Kasai, Shizuoka (JP); Sadao Ohsawa, Shizuoka (JP)

(73) Assignee: FUJIFILM Corporation, Tokyo (JP)

( * ) Notice: Subject to any disclaimer, the term of this patent is extended or adjusted under 35 U.S.C. 154(b) by 32 days.

(21) Appl. No.: 10/809,832

(22) Filed: Mar. 26, 2004

(65) Prior Publication Data

US 2004/0188887 A1    Sep. 30, 2004

(30) Foreign Application Priority Data

Mar. 28, 2003   (JP)   ............ P.2003-090961
Jun. 9, 2003    (JP)   ............ P.2003-163648

(51) Int. Cl.
*B29C 65/02* (2006.01)

(52) U.S. Cl. ............ 264/460; 264/308; 264/113
(58) Field of Classification Search .......... 264/112, 264/113, 308, 497, 109, 463, 255, 73
See application file for complete search history.

(56) References Cited

U.S. PATENT DOCUMENTS

| | | | |
|---|---|---|---|
| 5,387,380 A | | 2/1995 | Cima et al. |
| 6,117,612 A | * | 9/2000 | Halloran et al. ............ 430/269 |
| 6,322,728 B1 | * | 11/2001 | Brodkin et al. ............ 264/19 |
| 6,896,839 B2 | | 5/2005 | Kubo et al. |
| 2002/0105114 A1 | | 8/2002 | Kubo et al. |
| 2002/0125592 A1 | * | 9/2002 | Schulman et al. ............ 164/16 |

FOREIGN PATENT DOCUMENTS

| | | |
|---|---|---|
| JP | 05-286040 A | 11/1993 |
| JP | 11-100305 A | 4/1999 |
| JP | 2002-067172 A | 3/2002 |
| JP | 2002-307562 A | 10/2002 |
| WO | WO 98/09798 | 3/1998 |

OTHER PUBLICATIONS

Maitland, John, UV Printing/UV Chemistries, Mar. 20, 2004, Nordson, pp. 1-3.*
Japanese Office Action No. 2003-163648 dated Dec. 13, 2007.

* cited by examiner

*Primary Examiner*—Edmund H. Lee
(74) *Attorney, Agent, or Firm*—Sughrue Mion, PLLC

(57) ABSTRACT

A process of producing a three-dimensionally shaped object comprising a layer forming step of forming a powder material having a refractive index $n_1$ into a layer having a prescribed thickness on a support, a cross-sectional shape forming step of binding the layer of the powder material formed in the foregoing step into a prescribed cross-sectional shape with a binding agent having a refractive index $n_2$; and repeating these steps successively, wherein $n_1$ and $n_2$ satisfy the relationship of $-0.1 \leq (n_1 - n_2) \leq 0.1$.

14 Claims, No Drawings

PROCESS OF PRODUCING THREE-DIMENSIONALLY SHAPED OBJECT

FIELD OF THE INVENTION

The present invention relates to a three-dimensional shaping technique, especially to a process of producing a three-dimensionally shaped object by providing a binder to bind powder to produce a three-dimensionally shaped object.

BACKGROUND OF THE INVENTION

There has hitherto been known a technique in which a thin layer of powder corresponding to each of cross-sections obtained by cutting a subject to be three-dimensionally shaped at a plurality of parallel planes is bound with a binder, and the thus bound thin layer is successively laminated to prepare a shaped object as a three-dimensional model of the subject to be shaped.

Such a technique can be employed to applications of rapid prototyping and design confirmation. In recent years, a mode utilizing an inkjet, which is cheap and high-speed and is adaptive to color modeling preparation, is proposed and disclosed in, for example, Patent Document 1. A specific process of the three-dimensional shaping is described below.

First of all, a thin layer of powder is uniformly spread on the flat surface by means of a blade mechanism, and an inkjet nozzle head is scanned on a prescribed region of the thin layer of powder to discharge a binder. The powder material on the region where the binder has been discharged is subjected to necessary operation to become in the bound state and bind to an already formed lower layer. A powder layer is successively formed thereon, and the step of discharging a binder is repeated until the whole of a shaped object is completed. Finally, since in a region to which the binder has not adhered, the powders are in the individually independent and unbound state, when the shaped object is taken out from the device, the powder can be easily removed, whereby the shaped object can be separated. A desired three-dimensionally shaped object can be produced by the foregoing operations.

Also, in a similar method, a technique in which binders are colored in yellow (Y), magenta (M) and cyan (Y), thereby painting the three-dimensionally shaped object and enhancing the binding strength is disclosed, for example, in Patent Document 2.

However, it is the present state that according to the foregoing measures, the shaped object does not reach the satisfactory level with respect to characteristics (texture and color) as compared with the desired material. In particular, it is considered impossible to produce a three-dimensionally shaped object requiring transparent feeling due to a difference in property between the powder and the binder and the presence of voids formed by the use of the powder according to the conventional methods. Further, in order to impart smoothness to the surface, since overcoating and polishing treatments must be assisted by hands, it requires time and costs.

Also, according to painting by hands, it is ordinarily difficult to surely draw a desired pattern or the like at a prescribed position of a three-dimensionally shaped object.

On the other hand, since the three-dimensionally shaped object immediately after the production is formed relying on only a binding force of the binder, its strength may be possibly weak, resulting in collapse depending upon the handling method of the three-dimensionally shaped object. Thus, for increasing the strength, impregnation of a resin or wax into the spaces between powder particles of the three-dimensionally shaped object after the production has hitherto been conducted. However, such a step requires labors and time.

Patent Document 1: Japanese Patent No. 2,729,110

Patent Document 2: JP-A-2001-150556 (the term "JP-A" as used herein means an "unexamined published Japanese patent application")

SUMMARY OF THE INVENTION

Under these circumstances, the invention has been made, and its primary object is to provide a three-dimensional shaping technique capable of producing an adequate three-dimensionally shaped object. In particular, the object is to produce a three-dimensionally shaped object having a variety of appearance characteristics within a short period of time and at low cost.

Other objects of the invention will become apparent from the following description.

The foregoing objects of the invention are achieved by the following measures.

(1) A process of producing a three-dimensionally shaped object comprising a layer forming step of forming a powder material having a refractive index ni into a layer having a prescribed thickness on a support, a cross-sectional shape forming step of binding the layer of the powder material formed in the foregoing step into a prescribed cross-sectional shape with a binding agent having a refractive index $n_2$; and repeating these steps successively, wherein $n_1$ and $n_2$ satisfy the relationship of $-0.1 \leq (n_1-n_2) \leq 0.1$.

(2) A process of producing a three-dimensionally shaped object comprising:

(a) a layer forming step of forming a powder material having a refractive index $n_1$ into a layer having a prescribed thickness;

(b) a cross-sectional shape forming step of feeding an ultraviolet (UV) curable binder in a cross-sectional shape into the powder material layer formed in the foregoing step and irradiating UV rays to cure the binder, thereby forming a bound body of the powder material in the cross-sectional shape corresponding to a cut surface of a subject to be shaped cut at a certain one plane with a binding agent having a refractive index $n_2$ after the curing; and (c) repeating these steps successively, thereby successively laminating and forming the bound body of the powder material corresponding to a cut surface of the subject to be shaped cut at a plurality of planes, wherein (d) $n_1$ and $n_2$ satisfy the relationship of $-0.1 \leq (n_1-n_2) \leq 0.1$.

(3). A process of producing a three-dimensionally shaped object comprising:

(a) a layer forming step of forming a powder material into a layer having a prescribed thickness;

(b) a cross-sectional shape forming step of feeding a UV curable binder in a cross-sectional shape into the powder material layer formed in the foregoing step, thereby forming a bound body of the powder material in the cross-sectional shape corresponding to a cut surface of a subject to be shaped with a binding agent formed by curing the binder upon irradiation with UV rays; and (c) repeating these steps successively, thereby successively laminating and forming the bound body of the powder material corresponding to a cut surface of the subject to be shaped cut at a plurality of planes, wherein (d) a volatile component of the UV curable binder after the curing with UV rays is not more than 5% by weight.

(4) The process of producing a three-dimensionally shaped object as set forth in any one of (1) to (3) above, wherein the powder material is a cured material of the UV curable binder to be used for binding.

(5) The process of producing a three-dimensionally shaped object as set forth in any one of (1) to (3) above, wherein the powder material is magnesium hydroxide, silica gel, or aluminum hydroxide.

(6) The process of producing a three-dimensionally shaped object as set forth in (2) above, wherein a volatile component of the UV curable binder after the curing with UV rays is not more than 5% by weight.

(7) The process of producing a three-dimensionally shaped object as set forth in (5) above, wherein the magnesium hydroxide, silica gel or aluminum hydroxide has a mean particle size of from 0.1 to 1,000 µm.

(8) The process of producing a three-dimensionally shaped object as set forth in (2) or (3) above, wherein the UV curable binder contains at least one kind of polyfunctional acrylate or methacrylate monomers.

(9) The process of producing a three-dimensionally shaped object as set forth in (8) above, wherein at least one kind of the polyfunctional acrylate or methacrylate monomers accounts for from 20% by weight to 90% by weight of the total UV curable binder.

(10) The process of producing a three-dimensionally shaped object as set forth in (2) or (3) above, wherein the UV curable binder contains not more than 70% by weight of an additive for viscosity modification.

(11) The process of producing a three-dimensionally shaped object as set forth in (2) or (3) above, wherein the UV curable binder contains from 0.05% by weight to 10% by weight of a photopolymerization initiator having sensitivity to UV rays of from 450 to 250 nm.

(12) The process of producing a three-dimensionally shaped object as set forth in (2) or (3) above, wherein the UV curable binder contains one or more colorants of yellow (Y), magenta (M), cyan (C) and white (W).

(13) The process of producing a three-dimensionally shaped object as set forth in (12) above, wherein the colorant contains at least one kind of dyes or pigments.

(14) The process of producing a three-dimensionally shaped object as set forth in (2) or (3) above, wherein the UV curable binder has a viscosity of from 1 to 30 mPa·s.

(15) The process of producing a three-dimensionally shaped object as set forth in (2) or (3) above, wherein a feed measure of the UV curable binder into the powder material is an inkjet mode.

DETAILED DESCRIPTION OF THE INVENTION

The invention is concerned with a process of producing a three-dimensionally shaped object, which comprises a layer forming step of forming a powder material having a refractive index $n_1$ into a layer having a prescribed thickness on a support, a cross-sectional shape forming step of binding the layer of the powder material formed in the foregoing step into a prescribed cross-sectional shape with a binding agent having a refractive index $n_2$; and repeating these steps successively, wherein $n_1$ and $n_2$ satisfy the relationship of $-0.1 \leq (n_1-n_2) \leq 0.1$.

The refractive index of the powder material that is used in the invention can be determined by an indirect method. That is, a mixed solvent in which even when mixed with the powder material, the powder cannot be visibly confirmed is prepared, and a refractive index of the mixed solvent is determined, whereby the refractive index can be considered equal to the refractive index of the powder material. A specific measurement operation by the indirect method is described, for example, in the item of "Measurement of Powders" in an instruction manual of Abbe Refractometer Model 3, manufactured by Atago Co., Ltd. A specific example of the measurement will be described in the Examples described later.

The powder material is preferably a fine powder having a mean particle size of from 0.1 to 1,000 µm, and more preferably from 1 to 50 µm. Though the particle size distribution maybe broad, it is preferably narrow. The powder material may be an organic material, an inorganic material, or an inorganic and organic composite material. Details will be described later.

As the support, supports having an appropriate surface shape can be used. Of these, supports having a smooth surface are preferable, and supports having a flat surface can be preferably used. It is preferable to use a support having a frame that can be stretched to an extent of the height of the three-dimensionally shaped object to be produced or more in the surrounding thereof.

With respect to the prescribed thickness of the powder material layer, it is preferable to form the layer having a thickness of from 10 to 500 µm, and more preferably from 50 to 150 µm per slice pitch. Whenever one cycle of the layer forming step and the cross-sectional shape forming step is repeated, the lamination thickness of the whole of the powder material layer increases by the foregoing slice pitch.

The prescribed cross-sectional shape as referred to herein means a shape accompanied with color corresponding to the cut surface of a subject to be shaped cut at one plane.

One preferred embodiment in the production process of a three-dimensionally shaped object according to the invention will be described below. In the following steps, prior to the layer forming step and the cross-sectional shape forming step, a three-dimensional shape coloring data preparing step and a cross-sectional data preparing step are carried out.

In the first step, a model data expressing a subject to be three-dimensionally shaped, the surface of which is given a color pattern or the like is prepared by a computer. As the model data that is a basis for shaping, a color three-dimensional model data that is prepared by a conventional 3D-CAD modeling software can be employed. Also, three-dimensional shape data and texture measured by a three-dimensional shape input unit can be applied.

In the second step, a cross-sectional data is formed every cross-section of the subject to be shaped sliced in the horizontal direction from the foregoing model data. A cross-sectional body sliced with a pitch corresponding the thickness of one layer of the powder to be laminated is cut out from the model data, and shape data and color data exhibiting a region where the cross-section is present are prepared as a cross-section data. In the invention, the "shape data" and the "painting data" may be collectively referred to as a "cross-sectional shape data", sometimes.

Subsequently, information regarding the lamination thickness of the powder (slice pitch at the preparation of cross-sectional data) and the lamination number (the number of cross-sectional data sets) in shaping the subject to be shaped is input into a drive control section of a cross-sectional shape preparing unit from the computer.

In the third step, a powder material that is a material for producing a three-dimensionally shaped object in a shaping stage is fed. Using a counter rotation mechanism of the powder material (hereinafter referred to as "counter roller"), the powder material is spread all over in the flat stratiform state, and after completing the feed of a prescribed amount of the powder, the feed of the powder material is stopped.

The fourth step is a step of forming a cross-sectional shape based on the cross-sectional shape data of the cut surface. In the step, it is preferable to employ a non-contact mode. An inkjet mode will be described below as a representative example thereof.

An inkjet head is moved within the XY plane according to the shape data and color data formed in the second step. Then, an ultraviolet (UV) curable binder is appropriately discharged from each of inkjet discharge nozzles based on the color data during the movement. At the same time, the surface of the binder discharged is subjected to UV exposure from a UV exposure unit to form a bound body of the powder material. The UV exposure may be carried out after discharging the UV curable binder.

When the UV irradiation is carried out in an inert gas atmosphere such as nitrogen and argon, a radical polymerization delay effect due to oxygen can be reduced.

The inkjet mode used mainly means an on-demand inkjet mode, and examples thereof include a piezo on-demand inkjet mode, a thermal on-demand inkjet mode and an electrostatic on-demand inkjet mode. Of these, a piezo on-demand inkjet mode and an electrostatic on-demand inkjet mode are preferable from the standpoint of stability of the UV curable binder.

Then, by repeating the third step and the fourth step, the desired three-dimensionally shaped object can be obtained.

In a region of the powder material on which the binder is not discharged, the powder keeps the individually independent state.

In the fifth step, the powder material in a region where no binding agent is given is separated, and the bound body of the powder bound with a binding agent (three-dimensionally shaped object) is taken out. The unbound powder material is recovered and can be again utilized as the material.

By repeating the third step and the fourth step successively, it is possible to produce a three-dimensionally shaped object by successively laminating and forming a bound body of the powder material corresponding to a cut surface of the subject to be shaped cut at a plurality of planes.

By binding a layer of a powder material having a refractive index $n_1$ into a cross-sectional shape with a binding agent having a refractive index $n_2$ (wherein $n_1$ and $n_2$ satisfy the relationship of $-0.1 \leq (n_1-n_2) \leq 0.1$), it is possible to produce a substantially transparent three-dimensionally shaped object.

Each of the components used in the invention will be described below. However, it should not be construed that the components used are limited to the following contents.

(Powder Material)

As the powder material, all of inorganic powder and organic powders and inorganic and organic composite powders can be used.

Examples of inorganic powders include metals, oxides, composite oxides, hydroxides, carbonates, sulfates, silicates, phosphates, nitrides, carbides and sulfides of metals, and composite compounds of at least two kinds thereof. Specific examples include magnesium hydroxide, silica gel, aluminum hydroxide, alumina, glass, titanium oxide, zinc oxide, zirconium oxide, tin oxide, potassium titanate, aluminum borate, magnesium oxide, magnesium borate, potassium hydroxide, basic magnesium sulfate, calcium carbonate, magnesium carbonate, calcium sulfate, magnesium sulfate, calcium silicate, magnesium silicate, calcium phosphate, silicon nitride, titanium nitride, aluminum nitride, silicon carbide, titanium carbide, zinc sulfide, and composite compounds of at least two kinds thereof. Of these, magnesium hydroxide, silica gel, aluminum hydroxide, alumina, glass, calcium carbonate, magnesium carbonate, calcium sulfate, and magnesium sulfate are preferable.

Examples of organic powders include synthetic resin particles and natural polymer particles. Specific examples include acrylic resins, polyethylene, polypropylene, polyethylene oxide, polypropylene oxide, polyethyleneimine, polystyrene, polyurethanes, polyureas, polyesters, polyamides, polyimides, carboxymethyl cellulose, gelatin, starch, chitin, and chitosan. Of these, acrylic resins, polyurethanes, gelatin, and polystyrene are preferable; and polymer resin particles of a UV curable binder comprising acrylic resin are more preferable.

Examples of inorganic and organic composite powders include composite materials of the foregoing organic powders and inorganic powders.

The powder material has a mean particle size ranging from 0.1 to 1,000 µm, preferably from 0.5 to 500 µm, more preferably from 1 to 300 µm, and especially preferably from 1 to 50 µm.

As the shape of the powder material, any shape such as an amorphous shape, a spherical shape, a tabular shape, an acicular shape, and a porous shape can be employed.

The refractive index $n_1$ of the powder material is preferably in the range of from 1.4 to 1.7.

The refractive index of the binding agent in the state where it can bind the powder material each other is defined as $n_2$. In the case where an ethylenically unsaturated monomer is used as the binder, the refractive index of the binding agent formed by polymerizing the monomer is defined as $n_2$. The smaller the absolute value of $(n_1-n_2)$, the higher the transparency of the resulting shaped object is. When the absolute value of the difference in the refractive index is not more than 0.2, the transparent feeling starts to reveal; when it is not more than 0.1, the transparent feeling becomes high; and when it is not more than 0.06, a closely transparent shaped object is obtained. In the invention, the term "closely transparent" or "substantially turbidity-free and transparent" means that the transmittance per cm of the optical path is 50% or more.

(UV Curable Binder)

In the invention, a binding agent formed by curing a UV curable binder is preferably used.

The UV curable binder comprises a photopolymerization initiator, a polymerizable monomer, and an additive for viscosity modification. Substantially all of the constitutional materials are cured with UV rays and have a function to bind the powder material.

With respect to the proportion of the respective constitutional materials, the amount of the photo-polymerization initiator is preferably from 0.05% by weight to 10% by weight, and more preferably from 0.1% by weight to 5% by weight; the amount of the monomer is preferably from 20% by weight to 90% by weight, and more preferably from 40% by weight to 80% by weight; and the amount of the additive for viscosity modification is preferably from 0% by weight to 70% by weight, and more preferably from 10% by weight to 60% by weight, respectively based on the total amount of the monomer, photopolymerization initiator and additive for viscosity modification. The binder preferably has a liquid viscosity of from 1 to 30 mPa·s, and more preferably from 2 to 20 mPa·s.

[Polymerizable Monomer]

As the polymerizable monomer that can be used in the UV curable binder, monomers in which addition polymerization is initiated by a radical species or cation species generated from the photopolymerization initiator upon irradiation with UV rays, thereby forming a polymer are preferably used. For examples, monomers having at least one ethylenically unsaturated double bond are radical polymerizable compounds and are selected from compounds having at least one terminal ethylenically unsaturated bond, and preferably at least two terminal ethylenically unsaturated bonds. Such compounds are broadly known in the field of art and can be used in the invention without particular limitations.

These compounds have a chemical form such as monomers, prepolymers (including dimers, trimers or oligomers), and mixtures thereof. Examples of monomers include unsaturated carboxylic acids (for example, acrylic acid, methacrylic acid, itaconic acid, crotonic acid, isocrotonic acid, and maleic acid) and esters or amides thereof. Esters of an unsaturated carboxylic acid and an aliphatic polyhydric alcohol compound and amides of an unsaturated carboxylic acid and an aliphatic polyhydric amine compound are preferably used.

Also, addition reaction products of an unsaturated carboxylic acid ester or amide containing a nucleophilic substituent (for example, a hydroxyl group, an amino group, and a mercapto group) with a monofunctional or polyfunctional isocyanate or an epoxy compound; and dehydration condensation reaction products of the foregoing unsaturated carboxylic acid ester or amide with a monofunctional or polyfunctional carboxylic acid are suitably used. Also, addition reaction products of an unsaturated carboxylic acid ester or amide containing an electrophilic substituent (for example, an isocyanato group and an epoxy group) with a monofunctional or polyfunctional alcohol, amine or thiol; and displacement reaction products of an unsaturated carboxylic acid ester or amide containing a releasable substituent (for example, a halogen group and a tosyloxy group) with a monofunctional or polyfunctional alcohol, amine or thiol are suitable. Also, as other example, it is possible to use the compounds in which, the unsaturated carboxylic acid is replaced by an unsaturated phosphonic acid, styrene, or the like.

As specific examples of radical polymerizable compounds that are an ester of an aliphatic polyhydric alcohol compound and an unsaturated carboxylic acid, examples of (meth) acrylic acid esters include ethylene glycol di(meth)acrylate, triethylene glycol di(meth)acrylate, 1,3-butanediol di-(meth)acrylate, tetramethylene glycol di(meth)acrylate, propylene glycol di(meth)acrylate, neopentyl glycol di-(meth)acrylate, trimethylolpropane tri(meth)acrylate, tri-methylolpropane tri ((meth)acryloyloxypropyl) ether, tri-methylolethane tri (meth)acrylate, hexanediol di-(meth)acrylate, 1,4-cyclohexanediol di(meth)acrylate, tetraethylene glycol di(meth) acrylate, pentaerythritol di(meth)acrylate, pentaerythritol tri (meth)acrylate, pentaerythritol tetra(meth)acrylate, dipentaerythritol di(meth)acrylate, dipentaerythritol hexa(meth)acrylate, sorbitol tri(meth)acrylate, sorbitol tetra (meth) acrylate, sorbitol penta(meth)acrylate, sorbitol hexa(meth) acrylate, tri((meth)acryloyloxyethyl) isocyanurate, polyester (meth)acrylate oligomers, bis[p-(3-(meth)acryloxy-2-hydroxypropoxy)phenyl]dimethylmethane, and bis[p-( (meth)-acryloxyethoxy)phenyl]dimethylmethane.

The foregoing expression "(meth)acrylic acid ester" is an abbreviated expression capable of taking both structures of a methacrylic acid ester and an acrylic acid ester.

Examples of itaconic acid esters include ethylene glycol diitaconate, propylene glycol diitaconate, 1,3-butanediol diitaconate, 1,4-butanediol diitaconate, tetramethylene glycol diitaconate, pentaerythritol diitaconate, and sorbitol tetraitaconate.

Examples of crotonic acid esters include ethylene glycol dicrotonate, tetramethylene glycol dicrotonate, penta-erythritol dicrotonate, and sorbitol tetracrtonate.

Examples of isocrotonic acid esters include ethylene glycol diisocrotonate, pentaerythritol diisocrotonate, and sorbitol tetraisocrotonate.

Examples of maleic acid esters include ethylene glycol dimaleate, triethylene glycol dimaleate, pentaerythritol dimaleate, and sorbitol tetramaleate.

As examples of other esters, aliphatic alcohol based esters described in JP-B-46-27926 (the term "JP-B" as used herein means an "examined Japanese patent publication"), JP-B-51-47334, and JP-A-57-196231; esters having an aromatic based skeleton described in JP-A-59-5240, JP-A-59-5241, and JP-A-2-226149; and esters containing an amino group described in JP-A-1-165613 are also suitably used.

Specific examples of monomers of an amide of an aliphatic polyhydric amine compound and an unsaturated carboxylic acid include methylene bis-acrylamide, methylene bis-methacrylamide, 1,6-hexamethylene bis-acrylamide, 1,6-hexamethylene bis-methacrylamide, diethylenetriamine tris-acrylamide, xylylene bis-acrylamide, and xylylene bis-methacrylamide.

As examples of other preferred amide based monomers, those having a cyclohexylene structure described in JP-B-54-21726 are enumerated.

Also, urethane based addition polymerizable compounds produced using addition reaction of an isocyanate with a hydroxyl group are suitable. Specific examples thereof include vinylurethane compounds containing two or more polymerizable vinyl groups in one molecule, which are obtained by adding a hydroxyl group-containing vinyl monomer represented by the following formula (I) to a polyisocyanate compound containing two or more isocyanato groups per molecule, described in JP-B-48-41708.

$$CH_2=C(R^1)COOCH_2CH(R^2)OH \quad (I)$$

In the formula, $R^1$ and $R^2$ each represents H or $CH_3$.

To make the formulation of the powder material identical with that of the binding agent is one method for making a different in the refractive index between the powder material and the binding agent close to zero. For such a purpose, powder particles obtained by block polymerizing a binder monomer and pulverizing the resulting polymer can be used. The binder monomer can be formed into a powder material having a desired particle size by suspension polymerization or pearl polymerization.

In the invention, a cationic polymerizable monomer containing two or more cyclic ether groups such as an epoxy group and/or an oxetane group in the molecule can be used as the UV curable binder together with a UV cationic polymerization intiator.

It is preferable that the UV curable binder after the curing has a volatile component of not more than 5% by weight. For such a purpose, it is preferable that the binder is of a solvent-free formulation in which no organic solvent is used. Also, it is preferable that the amount of the monofunctional ethylenically unsaturated monomer to be used is not more than 70% by weight of the weight of the total monomers.

For the sake of reducing the volatile component after the curing, after producing a three-dimensionally shaped object, the residual monomer can be subjected to post polymerization upon irradiation with UV rays or heating.

[Photopolymerization Initiator]

It is preferable that the monomer used in the invention is cured using a photopolymerization initiator. A heat polymerization initiator can also be used.

As the photopolymerization initiator, compounds capable of generating a radical species or cation species by energy of UV rays and initiating and promoting the polymerization of a polymerizable ethylenically unsaturated group-containing compound can be used.

The heat polymerization initiator is known, and compounds having a bond with small bond dissociation energy can be used. The heat polymerization initiator can be used singly or in admixture of two or more thereof.

Examples of compounds capable of generating a radical species or cation species, which can initiate the addition polymerization, include organic halide compounds, carbonyl compounds, organic peroxide compounds, azo based polymerization initiators, azide compounds, metallocene compounds, hexaaryl biimidazole compounds, organic boric acid compounds, disulfonic acid compounds, and onium salt compounds.

As the foregoing organic halide compounds, compounds described in Wakabayashi, et al., *Bull Chem. Soc.* Japan, 42, 2924 (1969), U.S. Pat. No. 3,905,815, JP-B-46-4605, JP-A-48-36281, JP-A-55-32070, JP-A-60-239736, JP-A-61-169835, JP-A-61-169837, JP-A-62-58241, JP-A-62-212401, JP-A-63-70243, JP-A-63-298339, and M. P. Hutt, *Journal of Heterocyclic Chemistry*, 1 (No. 3), (1970) are specifically enumerated. Especially, trihalomethyl group-substituted oxazole compounds or s-triazine compounds are enumerated.

s-Triazine derivatives in which at least one mono-, di- or tri-halogen-substituted methyl group is bound in the s-triazine ring are more preferable. Specific examples thereof include 2,4,6-tris(monochloromethyl)-s-triazine, 2,4,6-tris (dichloromethyl)-s-triazine, 2,4,6-tris(tri-chloromethyl)-s-triazine, 2-methyl-4,6-bis(trichloromethyl)-s-triazine, 2-n-propyl-4,6-bis (trichloromethyl)-s-triazine, 2-(α,α,β-trichloroethyl)-4,6-bis(trichloromethyl)-s-triazine, 2-phenyl-4,6-bis(trichloromethyl)-s-triazine, 2-(p-methoxyphenyl)-4,6-bis(trichloromethyl)-s-triazine, 2-(3,4-epoxyphenyl)-4,6-bis(trichloromethyl)-s-triazine, 2-(p-chlorophenyl)-4,6-bis(trichloromethyl)-s-triazine, 2-[1-(p-methoxyphenyl)-2,4-butadienyl]-4,6-bis(trichloromethyl)-s-triazine, 2-styryl-4,6-bis-(trichloromethyl)-s-triazine, 2-(p-methoxystyryl)-4,6-bis-(trichloromethyl)-s-triazine, 2-(p-isopropyloxysty-ryl)-4,6-bis(trichloromethyl)-s-triazine, 2-(p-tolyl)-4,6-bis(trichloromethyl)-s-triazine, 2-(4-methoxynaphthyl)-4,6-bis(trichloromethyl)-s-triazine, 2-phenylthio-4,6-bis(trichloromethyl)-s-triazine, 2-benzyl-thio-4,6-bis(trichloromethyl)-s-triazine, 2,4,6-tris(di-bromomethyl)-s-triazine, 2,4,6-tris(tribromomethyl)-s-triazine, 2-methyl-4,6-bis(tribromomethyl)-s-triazine, and 2-methoxy-4,6-bis (tribromomethy)-s-triazine.

Examples of the foregoing carbonyl compounds include benzophenone derivatives such as benzophenone, Michler's ketone, 2-methylbenzophenone, 3-methylbenzophenone, 4-methylbenzophenone, 2-chlorobenzophenone, 4-bromobenzophenone, and 2-carboxybenzophenone; acetophenone derivatives such as 2,2-dimethoxy-2-phenylacetophenone, 2,2-diethoxyacetophenone, 1-hydroxycyclohexyl phenyl ketone, a-hydroxy-2-methylphenylpropane, 1-hydroxy-1-methylethyl-(p-isopropylphenyl) ketone, 1-hydroxy-1-(p-dodecyl-phenyl) ketone, 2-methyl-(4'-(methylthio)phenyl)-2-morpholino-1-propane, and 1,1,1-trichloromethyl-(p-butylphenyl) ketone; thioxanthone derivatives such as thioxanthone, 2-ethylthioxanthone, 2-isopropylthioxanthone, 2-chlorothioxanthone, 2,4-dimethylthioxanthone, 2,4-diethylthioxanthone, and 2,4-diisopropylthioxanthone; and benzoic acid ester derivatives such as ethyl p-dimethylaminobenzoate and ethyl p-diethylaminobenzoate.

As the foregoing azo compounds, azo compounds described in JP-A-8-108621 can be used.

Examples of the foregoing organic peroxide compounds include trimethylcyclohexanone peroxide, acetylacetone peroxide, 1,1-bis(tert-butylperoxy)-3,3,5-trimethylcyclohexane, 1,1-bis(tert-butylperoxy)cyclohexane, 2,2-bis-(tert-butylperoxy)butane, tert-butyl hydroperoxide, cumene hydroperoxide, diisopropylbeznene hydroperoxide, 2,5-dimethylhexane-2,5-dihydroperoxide, 1,1,3,3-tetra-methylbutyl hydroperoxide, tert-butylcumyl peroxide, dicumyl peroxide, 2,5-dimethyl-2,5-di(tert-butylperoxy)hexane, 2,5-oxanoyl peroxide, succinic peroxide, benzoyl peroxide, 2,4-dichlorobenzoyl peroxide, diisopropyl peroxydicarbonate, di-2-ethylhexyl peroxydicarbonate, di-2-ethoxyethyl peroxydicarbonate, dimethoxyisopropyl peroxycarbonate, di(3-methyl-3-methoxybutyl) peroxydicarbonate, tert-butyl peroxyacetate, tert-butyl peroxypivalate, tert-butyl peroxyneodecanoate, tert-butyl peroxyoctanoate, tert-butyl peroxylaurate, 3,3',4,4'-tetra-(t-butylperoxycarbonyl)benzophenone, 3,3',4,4'-tetra-(t-hexylperoxycarbonyl)benzophenone, 3,3',4,4'-tetra-(p-isopropylcumylperoxycarbonyl)benzophenone, carbonyl di(t-butylperxoydihydrogendiphthalate), and carbonyl di(t-hexylperoxydihydrogendiphthalate).

Examples of the foregoing metallocene compounds include a variety of titanocene compounds described in JP-A-59-152396, JP-A-61-151197, JP-A-63-41484, JP-A-2-249, JP-A-2-4705, and JP-A-5-83588 (for example, dicyclopentadienyl-Ti-bisphenyl, dicyclopentadienyl-Ti-bis-2,6-difluorophen-1-yl, dicyclopentadienyl-Ti-bis-2,4-difluorophen-1-yl, dicyclopentadienyl-Ti-bis-2,4,6-trifluorophen-1-yl, dicyclopentadienyl-Ti-bis-2,3,5,6-tetrafluorophen-1-yl, dicyclopentadienyl-Ti-bis-2,3,4,5,6-pentafluorophen-1-yl, dimethylcyclopentadienyl-Ti-bis-2,6-difluorophen-1-yl, dimethyl-cyclopentadienyl-Ti-bis-2,4,6-trifluorophen-1-yl, dimethylcyclopentadienyl-Ti-bis-2,3,5,6-tetrafluorophen-1-yl, and dimethylcyclopentadienyl-Ti-bis-2,3,4,5,6-pentafluorophen-1-yl); and iron-arene complexes described in JP-A-1-304453 and JP-A-1-152109.

Examples of the foregoing hexaaryl biimidazole compounds include a variety of compounds described in JP-B-6-29285 and U.S. Pat. Nos. 3,479,185, 4,311,783 and 4,622,286, and specific examples thereof include 2,2'-bis(o-chlorophenyl)-4,4',5,5'-tetraphenyl biimidazole, 2,2'-bis(o-bromophenyl)-4,4',5,5'-tetraphenyl biimidazole, 2,2'-bis-(o,p-dichlorophenyl)-4,4',5,5'-tetraphenyl biimidazole, 2,2'-bis (o-chlorophenyl)-4,4',5,5'-tetra(m-methoxyphenyl) biimidazole, 2,2'-bis(o,o'-dichlorophenyl)-4,4',5,5'-tetraphenyl biimidazole, 2,2'-bis(o-nitrophenyl)-4,4',5,5'-tetraphenyl biimidazole, 2,2'-bis-(o-methylphenyl)-4,4',5,5'-tetraphenyl diimidazole, and 2,2'-bis(o-trifluorophenyl)-4,4',5,5'-tetraphenyl biimidazole.

Specific examples of the foregoing organic boric acid salt compounds include organic boric acid salts described in JP-A-62-143044, JP-A-62-150242, JP-A-9-188685, JP-A-9-188686, JP-A-9-188710, JP-A-2000-131837, JP-A-2002-107916, Japanese Patent No. 2,764,769, JP-A-2002-116539, Kunz, Martin, *Rad Tech '98. Proceeding* Apr., 19-22, 1998, Chicago; organic boron sulfonium complexes or organic boron oxosulfonium complexes described in JP-A-6-157623, JP-A-6-175564, and JP-A-6-175561; organic boron iodonium complexes described JP-A-6-175554 and JP-A-6-175553; organic boron phosphonium complexes described in JP-A-9-188710; and organic boron transition metal-coordinated complexes described in JP-A-6-348011, JP-A-7-128785, JP-A-7-140589, JP-A-7-306527, and JP-A-7-292014.

Examples of the foregoing disulfone compounds include compounds described in JP-A-61-166544 and JP-A-2002-328465.

[Additive for Viscosity Modification]

As the additive for viscosity modification, compounds having a low viscosity and capable of being copolymerized with the polymerizable monomer are used. Examples thereof include acrylates, methacrylates, and acrylamides. Specific examples include tolyloxyethyl (meth)acrylate, phenyloxyethyl (meth)acrylate, cyclohexyl (meth)acrylate, ethyl (meth) acrylate, methyl (meth)acrylate, ethylene glycol di(meth) acrylate, divinylbenzene, methylene bisacrylamide, and 1,6-di(meth)-acryloyloxyhexane. Of these, tolyloxyethyl (meth) acrylate, ethylene glycol di(meth)acrylate, and 1,6-di(meth)-acryloyloxyhexane are preferable.

(Colorant)

[Dye]

As the dye, those conventionally used in the field of printing (for example, printing inks and coloring materials for copying or color proofing in heat-sensitive inkjet recording, electrostatic photographic recording, etc.) can be used.

For example, dyes described in the Society of Synthetic Organic Chemistry, Japan ed., *Dye Handbook*, published by Maruzen Co., Ltd. (1970); Sadaharu Yabeta and Kunihiko Imada, Manual: *Dye Chemistry*, published by Shikisensha Co., Ltd. (1988); Makoto Okawara ed., *Dyestuff Handbook*, published by Kodansha Ltd. (1986); *Chemicals for Inkjet Printer: Investigation on Trend and Prospects of Development of Materials*, published CMC Publishing Co., Ltd. (1997); and Takeshi Amari, *Chemicals for Inkjet Printer: Techniques and Materials of Inkjet Pirnters*, published CMC Publishing Co., Ltd. (1997) are enumerated.

As specific examples of dyes, dyes such as azo dyes, metal-containing azo dyes, metal complex salt dyes, azomethine dyes, naphthol dyes, anthaquinone dyes, indigo dyes, carbonium dyes, quinoneimine dyes, xanthene dyes, cyanine dyes, quinoline dyes, nitro dyes, nitroso dyes, benzoquinone dyes, naphthoquinone dyes, condensed polycyclic dyes (for example, phthalocyanine dyes, metallic phthalocyanine dyes, and perylene dyes), and nigrosine dyes are preferable.

The dyes can be used singly or in combination appropriately.

[Pigment]

The pigment is not particularly limited, but all of commercially available organic pigments and inorganic pigments, pigments dispersed in a resin insoluble in a dispersion medium, or pigments having a resin grafted on the surface thereof can be used. Also, resin particles colored with a dye can be used.

Specific examples of organic pigments and inorganic pigments are as follows. That is, examples of pigments exhibiting a yellow color include monoazo pigments such as C.I. Pigment Yellow 1 (for example, Fast Yellow G) and C.I. Pigment Yellow 74; disazo pigments such as C.I. Pigment Yellow 12 (for example, Disazo Yellow AAA) and C.I. Pigment Yellow 17; non-benzidine based azo pigments such as C.I. Pigment Yellow 180; azo lake pigments such as C.I. Pigment Yellow 100 (for example, Tartrazine Yellow Lake); condensed azo pigments such as C.I. Pigment Yellow 95 (for example, Condensed Azo Yellow GR); acid dye lake pigments such as C.I. Pigment Yellow 115 (for example, Quinoline Yellow Lake); basic dye lake pigments such as C.I. Pigment Yellow 18 (for example, Thioflavine Lake); anthraquinone based pigments such as Flavanthrone Yellow (Y-24); isoindolinone pigments such as Isoindolinone Yellow 3RLT (Y-110), quinophthalone pigments such as Quinophthalone Yellow (Y-138); isoindolinone pigments such as Isoindolinone Yellow (Y-139); nitroso pigments such as C.I. Pigment yellow 153 (for example, Nickel Nitroso Yellow); and a metal complex salt azomethine pigments such as C.I. Pigment Yellow 117 (for example, Copper Azomethine Yellow).

Examples of pigments exhibiting a magenta color include monozao based pigments such as C.I. Pigment Red 3 (for example, Toluidine Red); disazo pigments such as C.I. Pigment Red 38 (for example, Pyrazolone Red B); azo lake pigments such as C.I. Pigment Red 53:1 (for example, Lake Red C) and C.I. Pigment Red 57:1 (Brilliant Carmine 6B); condensed azo pigments such as C.I. Pigment Red 144 (for example, Condensed Azo Red BR); acid dye lake pigments such as C.I. Pigment Red 174 (for example, Phloxine B Lake); basic dye lake pigments such as C.I. Pigment Red 81 (for example, Rhodamine 6G' Lake); anthraquinone based pigments such as C.I. Pigment Red 177 (for example, Dianthraquinonyl Red); thioindigo pigments such as C.I. Pigment Red 88 (for example, Thioindigo Bordeaux); perynone pigments such as C.I. Pigment Red 194 (for example, Perynone Red); perylene pigments such as C.I. Pigment Red 149 (for example, Perylene Scarlet); quinacridone pigments such as Pigment Red 122 (for example, Quinacridone Magenta); isoindolinone pigments such as C.I. Pigment Red 180 (for example, Isoindolinone Red 2BLT); and alizarin lake pigments such as C.I. Pigment Red 83 (for example, Madder Lake).

Examples of pigments exhibiting a cyan color include disazo based pigments such as C.I. Pigment Blue 25 (for example, Dianisidine Blue); phthalocyanine pigments such as C.I. Pigment Blue 15 (for example, Phthalocyanine Blue); acid dye lake pigments such as C.I. Pigment Blue 24 (for example, Peacock Blue Lake); basic dye lake pigments such as C.I. Pigment Blue 1 (for example, Victoria Pure Blue BO Lake); anthraquinone based pigments such as C.I. Pigment Blue 60 (for example, Indanthrone Blue); and alkali blue pigments such as C.I. Pigment Blue 18 (Alkali Blue V-5:1).

As specific examples of white pigments, basic lead carbonate ($2PbCO_3Pb(OH)_2$, so-called "silver white"), zinc oxide (ZnO, so-called "zinc white"), titanium oxide ($TiO_2$, so-called "titanium white"), strontium titanate ($SrTiO_3$, so-called "Titaninm Strontium White") can be utilized.

Titanium oxide is small in specific gravity, is large in refractive index and is chemically and physically stable as compared with other white pigments. Therefore, titanium oxide is large in hiding power or coloring power as a pigment and is further excellent in durability against acids, alkalis and other environments. Accordingly, it is preferable to utilize titanium oxide as a white pigment. As a matter of course, other white pigment (may be other white pigment than those enumerated above) may be used depending on the kinds of the powder material and binder components.

Further, processed pigments in which pigment fine particles are dispersed in a rosin ester resin or vinyl chloride-vinyl acetate resin are commercially available and can be used. Specific examples of commercially available processed pigments include Microlith pigments manufactured by Ciba Speciality Chemicals. As preferred examples of processed pigments, a Microlith-T pigment in which the pigment is coated by a rosin ester resin is enumerated.

(UV Exposure)

With respect to the UV exposure for curing the UV curable binder, conventionally employed lamps such as high pressure mercury vapor lamps, low pressure mercury vapor lamps, and deep UV lamps can be used. The exposure wavelength is from 450 to 250 nm, and preferably from 400 to 300 nm; and the exposure energy is preferably not more than 500 $mJ/cm^2$, and more preferably not more than 400 $mJ/cm^2$, but preferably 10 $mJ/cm^2$ or more. It is possible to introduce UV rays onto the surface of the powder material from a UV light source using UV permeable optical fibers.

The present invention will be described in more detail with reference to the following examples, but the invention should not be construed as being limited thereto.

EXAMPLE 1

(Preparation of UV Curable Binding Agent)

| | |
|---|---|
| Monomer: Dipentaerythritol hexaacrylate | 8.0 g |
| Photopolymerization initiator: 2-Hydroxy-2-methylpropiophene (manufactured by Ciba Speciality Chemicals) | 0.6 g |
| Diluent: Tolyloxyethyl acrylate (manufactured by Soken Chemical & Engineering Co., Ltd.) | 8.0 g |

The foregoing components were stirred and mixed to obtain a colorless transparent liquid of about 20 mPa·s.

(Preparation of Powder Material A)

As a powder material, for the sake of making the adjustment of refractive index unnecessary, the foregoing UV curable binding agent was coated in a thickness of about 500 μm on a glass plate using a rod coater, and rays having a wavelength of from 300 to 350 nm of a high pressure mercury vapor lamp were introduced onto the coating film using glass fibers to irradiate the surface of the coating film at a light intensity of 50 mJ/cm$^2$ for 10 minutes. Thereafter, the irradiated coating film was finely divided using an agate mortar (motor-operated triturator) and an agate ball mill and then classified to obtain a powder material A having the maximum particle size of 20 μm.

(Preparation of Three-dimensional Model)

The powder material A was spread by a rod in a thickness of about 100 μm to form a powder layer, which was then subjected to drawing by an inkjet mode using the foregoing UV curable binding agent as an ink while optionally adjusting the discharge amount in portions requiring a strength, followed by curing upon irradiation with the UV rays for 60 seconds. Further, the operation was repeated to prepare a three-dimensionally shaped object.

(Measurement Method of Refractive Index)

The refractive index of the powder material of the invention was measured using Abbe Refractometer Model 3, manufactured by Atago Co., Ltd. according to the method described in the item of "Measurement of Powders" in the instruction manual thereof.

That is, since the powder material could not be measured for the refractive index directly by a refractometer different from a liquid, it was measured according to the following indirect method.

(a) Two kinds of transparent liquids having a refractive index of $n_1$ and $n_2$, respectively, which are well compatible with each other, were used. At this time, the liquids were chosen such that the refractive index of the powder material expected from literatures or the like falls between $n_1$ and $n_2$, that the liquids do not dissolve the powder material, and that the liquids do not react with each other.

(b) When a small amount of the powder material was charged in a clean test tube, and about 1 ml of one of the liquids (refractive index: $n_1$) was charged, the powder material was seen whitish.

(c) When the other liquid (refractive index: $n_2$) was charged little by little and stirred and mixed, the powder could not be visibly confirmed.

(d) At this time, a refractive index of the mixed liquid was measured at 25° C. using an Abbe's refractometer, thereby indirectly determining the refractive index of the powder material.

The method utilizes a phenomenon in which when the refractive index of the powder material is coincident with that of the liquid, irregular reflection on the surface of the powder material disappears, whereby the powder material is seen transparent, as described in the foregoing instruction manual.

Regarding the measurement principle of the Abbe's refractometer, the following literature was referred to.

The Japan Society of Mechanical Engineering ed., *Dictionary of Mechanical Engineering, First Edition*, published by the Japan Society of Mechanical Engineering and sold by Maruzen Co., Ltd., Aug. 20, 1997, pp. 94-95.

In the invention, necessary data of the refractive index were determined by mixing two kinds of liquids each having a known refractive index to prepare a liquid, the refractive index of which was appropriately changed, adding the material in the liquid, and measuring the refractive index at 25° C. using Abbe Refractometer Model 3, manufactured by Atago Co., Ltd. (Measurement method of the amount of volatile component)

The amount (W) of the volatile component of the UV curable binding agent was measured by the weight method according to the following equation.

$$W=(W_1-W_2)/W_1 \times 100\%$$

$W_1$: Weight of the UV curable binding agent before curing $W_2$: Weight of the UV curable binding agent after curing (Evaluation Method)

The thus prepared three-dimensionally shaped object of 3 cm (L)×3 cm (W)×3 cm (H) was placed in newspaper, and how the letters were seen from the top was visually evaluated, thereby making it as an index for transparency.

Also, the smoothness of the surface was sensorily evaluated through touch by fingers, thereby making it as an index for texture.

EXAMPLE 2

The evaluation was carried out in the same manner as in Example 1, except for using, as the powder, lightly pulverized magnesium hydroxide ($Mg(OH)_2$) as an inorganic material.

EXAMPLE 3

The evaluation was carried out in the same manner as in Example 1, except for using, as the powder, aluminum hydroxide ($Al(OH)_3$) that is good in fluidity, is hardly electrified and can be easily handled because it does not form a coagulation block (pore-free, light-permeable, mean particle size: 25 μm, ceramic raw material, refractive index (from the catalogue) 1.5 to 1.56, manufactured by Nacalai Tesque, Inc.).

EXAMPLE 4

Polymethyl methacrylate "PMMA" (monodispersed particle having a refractive index of 1.50 and a mean particle size of 1.5 μm, manufactured by Soken Chemical & Engineering Co., Ltd.) as an organic synthetic resin was used as the powder.

COMPARATIVE EXAMPLE 1

The shaping was carried out in the same manner using a polystyrene particle "PSt" (monodispersed particle having a refractive index of 1.61 and a mean particle size of 1.3 μm, manufactured by Soken Chemical & Engineering Co., Ltd.). Though it was difficult to coincide the refractive index of the monomer mixed solution with that of PSt, the evaluation was carried out in the manner as in Example 1.

The results obtained are summarized in Table 1.

TABLE 1

| | Powder | Refractive index difference* | Volatile component (%) | Transparent feeling | Texture |
|---|---|---|---|---|---|
| Example 1 | Power material A | 0.01 | 0.1 | ○ | ○ |
| Example 2 | Mg(OH)$_2$ | 0.09 | 0.3 | ○ | ○ |
| Example 3 | Al(OH)$_3$ | 0.06 | 0.2 | ○ | ○ |
| Example 4 | PMMA | 0.04 | 0.3 | ○ | ○ |
| Comparative Example 1 | PSt | 0.15 | 0.2 | X | ○ |

*Difference between refractive index of the powder material and refractive index of the UV curable binding agent after curing The transparent feeling was sensorily evaluated and rated as follows.

○: The shaped object was substantially turbidity-free and transparent.

X: The shaped object was substantially opaque or opaque.

XX: The shaped object was opaque and had uneven voids.

The texture was sensorily evaluated and rated as follows.

○: The surface was glossy and smooth.

X: The surface was in the sand-like granular state, and relatively large crater-like openings were partially observed.

According to Examples 1 to 4, the difference in the refractive index between the powder material and the UV curable binding agent after the curing is small, and generation of voids due to the volatile component is suppressed, whereby the shaped object having high transparent feeling and excellent texture can be obtained.

On the other hand, according to Comparative Example 1, when the refractive index is deviated, the transparent feeling is deteriorated even when the amount of the volatile component is small.

By making an absolute value of a difference in refractive index between a powder material and a binding agent binding the powder material not more than 0.1, it becomes possible to produce a transparent three-dimensionally shaped object having a smooth surface and excellent texture. Further, it is possible to make color clear, whereby a high-grade three-dimensionally shaped object that has hitherto been considered impossible can be prepared simply and at low costs. What the amount of a volatile component is reduced is advantageous in the production of a shaped object free from irregular reflection due to voids.

The entire disclosure of each and every foreign patent application from which the benefit of foreign priority has been claimed in the present application is incorporated herein by reference, as if fully set forth herein.

While the invention has been described in detail and with reference to specific embodiments thereof, it will be apparent to one skilled in the art that various changes and modifications can be made therein without departing from the spirit and scope thereof.

What is claimed is:

1. A process of producing a three-dimensionally shaped object comprising:
   (a) a layer forming step of forming a powder material having a refractive index $n_1$ into a layer having a prescribed thickness;
   (b) a cross-sectional shape forming step of feeding an ultraviolet (UV) curable binder in a cross-sectional shape into the powder material layer formed in the foregoing step and irradiating UV rays to cure the binder, thereby forming a bound body of the powder material in the cross-sectional shape corresponding to a cut surface of a subject to be shaped cut at a certain one plane with a binding agent having a refractive index $n_2$ after the curing; and
   (c) repeating these steps successively, thereby successively laminating and forming the bound body of the powder material corresponding to a cut surface of the subject to be shaped cut at a plurality of planes, wherein
   (d) $n_1$ and $n_2$ satisfy the relationship of $-0.1 \leq (n_1 - n_2) \leq 0.1$;
   (e) a volatile component of the UV curable binder after the curing with UV rays is not more than 5% by weight, wherein the ultraviolet (UV) curable binder consists essentially of a photopolymerization initiator, a polymerizable monomer and an additive for viscosity modification, wherein the additive for viscosity modification is a compound having a low viscosity and is capable of being copolymerized with the polymerizable monomer and
   (f) the amount (W) of the volatile component of the UV curable binder was measured by the weight method according to the following equation:

$$W = (W_1 - W_2)/W_1 \times 100\%$$

$W_1$: Weight of the UV curable binder before curing
   $W_2$: Weight of the UV curable binder after curing.

2. A process of producing a three-dimensionally shaped object comprising:
   (a) a layer forming step of forming a powder material into a layer having a prescribed thickness;
   (b) a cross-sectional shape forming step of feeding a UV curable binder in a cross-sectional shape into the powder material layer formed in the foregoing step, thereby forming a bound body of the powder material in the cross-sectional shape corresponding to a cut surface of a subject to be shaped with a binding agent formed by curing the binder upon irradiation with UV rays; and
   (c) repeating these steps successively, thereby successively laminating and forming the bound body of the powder material corresponding to a cut surface of the subject to be shaped cut at a plurality of planes, wherein
   (d) a volatile component of the UV curable binder after the curing with UV rays is not more than 5% by weight, wherein the ultraviolet (UV) curable binder consists essentially of a photopolymerization initiator, a polymerizable monomer and an additive for viscosity modification, wherein the additive for viscosity modification is a compound having a low viscosity and is capable of being copolymerized with the polymerizable monomer and
   (e) the amount (W) of the volatile component of the UV curable binder was measured by the weight method according to the following equation:

$$W = (W_1 - W_2)/W_1 \times 100\%$$

$W_1$: Weight of the UV curable binder before curing
   $W_2$: Weight of the UV curable binder after curing.

3. The process of producing a three-dimensionally shaped object as claimed in claim 1, wherein the powder material is a cured material of the UV curable binder to be used for binding.

4. The process of producing a three-dimensionally shaped object as claimed in claim 1, wherein the UV curable binder contains at least one kind of polyfunctional acrylate or methacrylate monomers.

5. The process of producing a three-dimensionally shaped object as claimed in claim 4, wherein at least one kind of the polyfunctional acrylate or methacrylate monomers accounts for from 20% by weight to 90% by weight of the total UV curable binder.

6. The process of producing a three-dimensionally shaped object as claimed in claim 1, wherein the UV curable binder contains not more than 70% by weight of an additive for viscosity modification.

7. The process of producing a three-dimensionally shaped object as claimed in claim 1, wherein the UV curable binder contains from 0.05% by weight to 10% by weight of a photopolymerization initiator having sensitivity to UV rays of from 450 to 250 nm.

8. The process of producing a three-dimensionally shaped object as claimed in claim 1, wherein the UV curable binder contains one or more colorants of yellow (Y), magenta (M), cyan (C) and white (W).

9. The process of producing a three-dimensionally shaped object as claimed in claim 8, wherein the colorant contains at least one kind of dyes or pigments.

10. The process of producing a three-dimensionally shaped object as claimed in claim 1, wherein the UV curable binder has a viscosity of from 1 to 30 mPa.s.

11. The process of producing a three-dimensionally shaped object as claimed in claim 1, wherein a feed measure of the UV curable binder into the powder material is an inkjet mode.

12. The process of producing a three-dimensionally shaped object as claimed in claim 1, wherein the UV curable binder is solvent free.

13. The process of producing a three-dimensionally shaped object as claimed in claim 2, wherein the UV curable binder is solvent free.

14. The process of producing a three-dimensionally shaped object as claimed in claim 3, wherein the UV curable binder is solvent free.

* * * * *